United States Patent
Echambadi et al.

(10) Patent No.: US 7,757,824 B2
(45) Date of Patent: Jul. 20, 2010

(54) AUTOMATIC BRAKE ADJUSTER FOR ADJUSTING THE SLACK BETWEEN THE BRAKE LINING AND BRAKE DRUM OF A VEHICULAR BRAKING SYSTEM

(75) Inventors: Krishnaswamy Parthasarathy Echambadi, Tamil Nadu (IN); Manipandian Seeniappan, Tamil Nadu (IN)

(73) Assignee: Madras Engineering Industries Private Ltd., Chennai (IN)

(*) Notice: Subject to any disclaimer, the term of this patent is extended or adjusted under 35 U.S.C. 154(b) by 770 days.

(21) Appl. No.: 11/547,911

(22) PCT Filed: Jul. 7, 2004

(86) PCT No.: PCT/IN2004/000201

§ 371 (c)(1),
(2), (4) Date: Oct. 10, 2006

(87) PCT Pub. No.: WO2005/098259

PCT Pub. Date: Oct. 20, 2005

(65) Prior Publication Data

US 2007/0209889 A1  Sep. 13, 2007

(30) Foreign Application Priority Data

Apr. 7, 2004  (IN) .......................... 320/CHE/2004

(51) Int. Cl.
*F16D 65/56* (2006.01)

(52) U.S. Cl. .................................. 188/79.55
(58) Field of Classification Search ............. 188/79.55, 188/196 V
See application file for complete search history.

(56) References Cited

U.S. PATENT DOCUMENTS

| | | | | |
|---|---|---|---|---|
| 3,662,865 | A * | 5/1972 | Newstead et al. | 188/196 F |
| 4,380,276 | A | 4/1983 | Sweet et al. | |
| 4,440,268 | A * | 4/1984 | Karlsson | 188/79.55 |
| 4,825,979 | A * | 5/1989 | Svensson | 188/79.55 |

FOREIGN PATENT DOCUMENTS

WO  WO 03/083322  10/2003

* cited by examiner

*Primary Examiner*—Bradley T King
*Assistant Examiner*—Anna Momper
(74) *Attorney, Agent, or Firm*—The Nath Law Group; Jerald L. Meyer; Sungyeop Chung

(57) ABSTRACT

An automatic brake adjuster which is capable of sensing an excess wear of the brake lining and which is automatically calibrated to maintain an optimum clearance is disclosed. The brake adjuster has a body, a one-way loc/clutch seat firstly with a rotatable worm shaft that forms a clutch mechanism with mutually engageable serrations, and secondly with one-way lock sleeve that forms a one-way lock mechanism to incorporate an integrated one-way clutch mechanism over the worm shaft.

2 Claims, 4 Drawing Sheets

AUTOMATIC BRAKE ADJUSTER FOR ADJUSTING THE SLACK BETWEEN THE BRAKE LINING AND BRAKE DRUM OF A VEHICULAR BRAKING SYSTEM

CROSS REFERENCE TO RELATED APPLICATIONS

This application is the United States National Stage filing of PCT Application PCT/IN2004/000201 having an international filing date of Jul. 7, 2004.

FIELD OF INVENTION

This invention relates to an improvement on Automatic Brake Adjuster with flexible reference point wherein one-way lock mechanism and clutch mechanism are integrated in one part and located on the worm shaft with the provision of isolating the one way lock mechanism and regulator worm gear wheel from heavy clutch spring load by a thrust sleeve arrangement for independent function. One-way lock mechanism is meant for sensing the excess lining clearance and adjusting the slack between the brake lining and brake drum whereas the clutch mechanism is to ignore the excess stroke of brake actuator due to elasticity in the foundation brake parts of a vehicular braking system.

PRIOR ART

In heavy commercial vehicle, such as trucks, trailers and buses generally a "S" shaped cam shaft drum brakes is widely used. The brake shoes with the brake lining rest on the "S" shaped cam shaft and are pressed against the brake drum during brake application. The splined portion of the "S" shaped camshaft protrudes out of the brake drum.

A Brake Adjuster connects the said S cam shaft to a push rod of the brake actuator. The Brake Adjuster is fitted onto the splined portion of the 'S' cam shaft at one end and at the other is connected to the push rod of the brake actuator. The air pressure applied to the brake actuator becomes the mechanical output which is transmitted as braking force through the push rod to the "S" shaped camshaft which expands the brake shoes and presses the lining against the brake drum so as to apply the brake.

The Automatic Brake Adjuster serves the purpose as a lever that transmits the braking force from the brake actuator to the S-cam shaft and a mechanical device to sense the excess lining clearance and adjusts the slack between the brake lining and the brake drum to an optimized value.

It is known in the prior art, that an Automatic Brake Adjuster is used as a lever to connect the push rod of the brake actuator and the splined camshaft of 'S' Cam brake. The 'S' cam brake consists of a brake drum, brake shoes and 'S'-camshaft. The brake shoe will be pressed against the brake drum during the application of brakes by the 'S' camshaft. The Automatic Brake Adjuster is used to transmit the braking force to the 'S' cam brake by the brake actuator that is operated by air pressure.

The sensing of the slackness of the brake due to the lining wear by the Automatic Brake Adjuster can be either by stroke or by clearance between the lining and the drum.

According to the stroke principle, the adjustment entirely depends on the push rod stroke of the brake actuator, or in other words the angular movement of Automatic Brake Adjuster is varied by the clearance between the brake lining and the brake drum.

According to the clearance principle which is claimed as an advanced system, the adjustment mechanism is able to sense various factors such as elasticity of brake drum and different structural parts in the brakes for varying the push rod stroke and differentiate the wear on the brake lining to optimize the lining clearance ignoring the influence of excess push rod stroke due to other factors.

OBJECT OF THE INVENTION

It is the first object of the invention for automatically sensing the excess wear of lining and calibrating so as to maintain the optimum clearance. During regular operation of the brakes of known art, the clearance between brake lining and drum increases due to lining wear resulting in increased push rod stroke of the brake actuator to apply the brake. It is essential to maintain optimum clearance for effective braking and periodical manual adjustment to maintain the clearance. Therefore it is the main object of the invention to provide an automatic brake adjuster with an internal mechanism to sense the excess wear of the lining and automatically rotate, the worm shaft engaged with the worm wheel and in turn the "S camshaft" for maintaining optimum clearance, thereby maintaining the angular movement of the Automatic Brake Adjuster to the desired limit.

It is another object of the invention to provide a highly reliable automatic brake adjuster which is a safety device to be capable of working under extremely bad environmental conditions and also under severe load and vibration conditions overcoming the limitation on space availability.

It is another object of the invention to provide an Automatic Brake Adjuster wherein adjustment of the excess lining clearance is made during the return stroke of the brake instead of adjusting the same during brake application which is known in prior art.

INVENTION WITH REFERENCE TO DRAWINGS

The invention will now be described with reference to the accompanying drawings, which illustrate by way of example and not by way of limitation, a preferred embodiment of this invention.

REFERENCE NUMERALS IN THE ENCLOSED DRAWINGS ARE AS FOLLOWS

Figure 1:
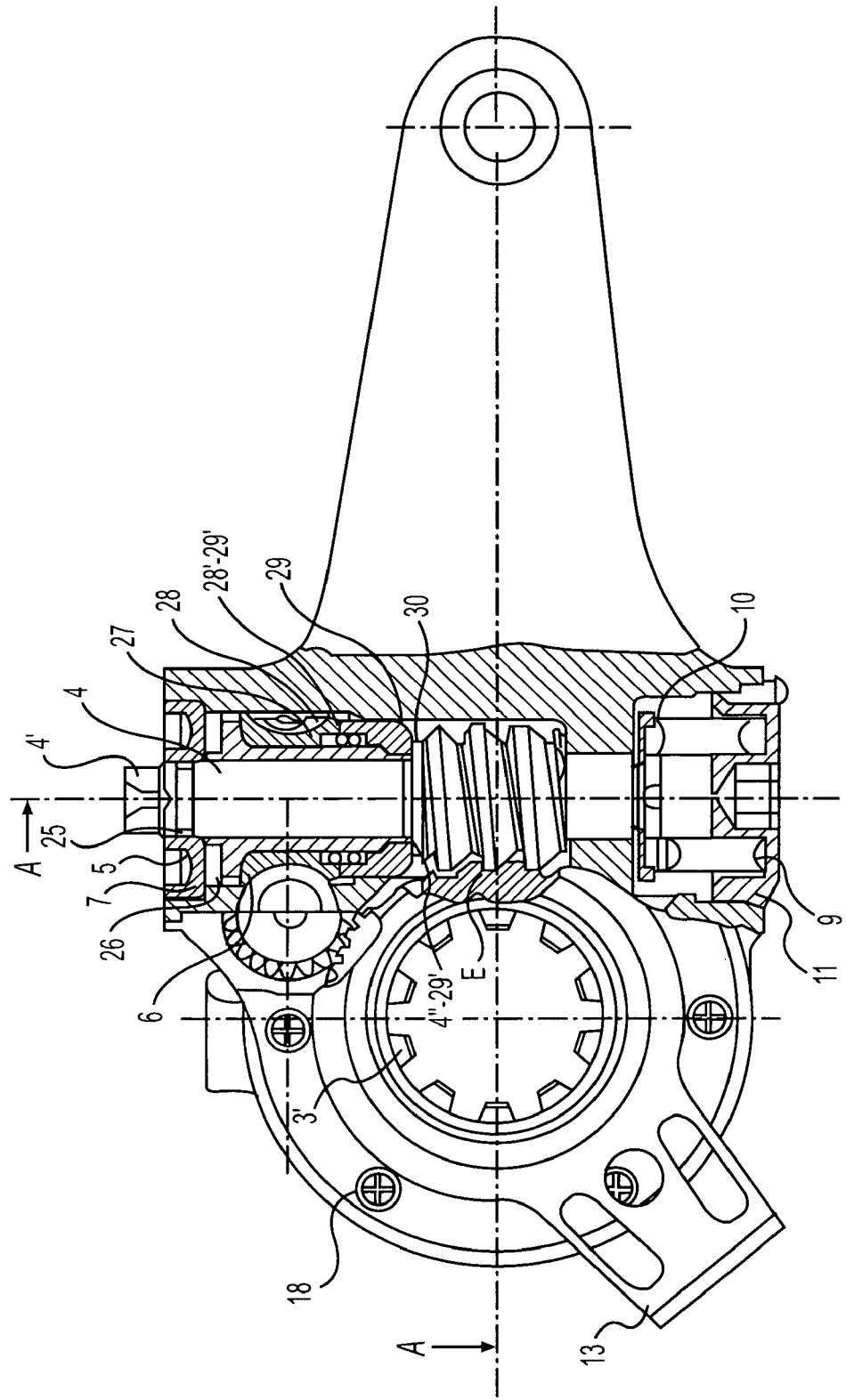
FIG. 1 is a Front view of an Automatic Brake Adjuster as per the invention.
Figure 2:
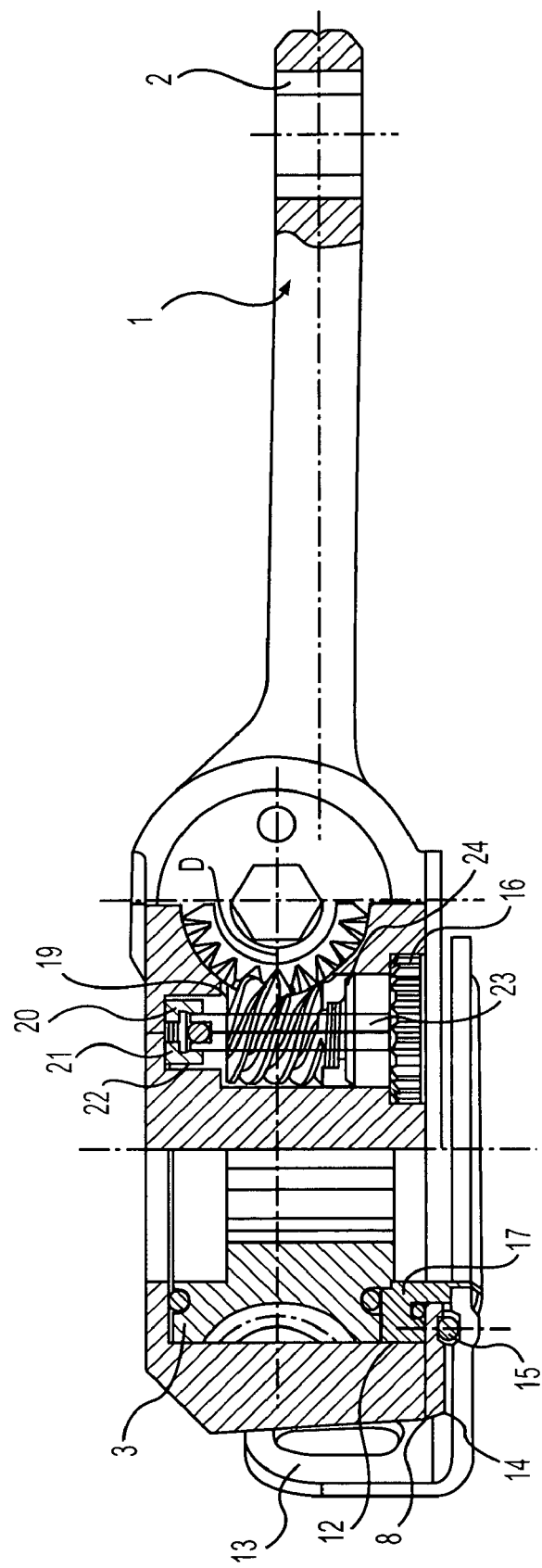
FIG. 2 is the End view sectioned along the line A-A of FIG. 1.

| | |
|---|---|
| 1 | Automatic Brake Adjuster Body |
| 2 | Tail Hole |
| 3 | Worm Wheel |
| 3' | Internal spline |
| 4 | Worm Shaft |
| 4' | Hexagon |
| 4" | Clutch serrations |
| 5 | Bearing retainer |
| 6 | Regulator worm wheel |
| 7 | Thrust Bearing |

-continued

| | |
|---|---|
| 8 | Gasket |
| 9 | Heavy Compression spring |
| 10 | Spring seat |
| 11 | Spring Retainer |
| 12 | Control gear wheel |
| 13 | Control arm |
| 13' | Control arm fixing portion |
| 14 | Cover plate |
| 15 | Sealing ring |
| 16 | Pinion |
| 17 | Sealing ring |
| 18 | Screws |
| 19 | Control worm screw |
| 20 | Guide |
| 21 | Screw |
| 22 | Spring |
| 23 | Spindle |
| 24 | Torsion spring |
| 25 | Sealing ring |
| 26 | Thrust sleeve |
| 27 | One way lock spring |
| 28 | One way lock sleeve |
| 29 | One way lock/clutch seat |
| 28'-29" | One way locking faces of one way lock sleeve |
| 29' | serrations of one way lock/clutch seat |
| 30 | Retaining ring |
| G | Pre set gap between stepped faces of control worm screw (19) pinion (16) |
| D | Control worm screw (19) meshes with the regulator worm wheel (6) |
| E | Worm wheel (3) meshes with worm shaft (4) |

DESCRIPTION OF INVENTION AS PER PREFERRED EMBODIMENTS

In a known Automatic Brake Adjuster the angular movement thereof is sensed by the control arm anchored to a fixed part on the vehicle chassis for establishing the reference point. But it is also desirable to provide a flexible reference point for easy installation on various models of vehicles instead of having a fixed reference point mounting with reference to the Automatic Brake Adjuster body, to avoid the additional care required for the initial installation and also for easy installation for users during re-fitment and after servicing. To overcome the above problem the control arm of the Automatic Brake Adjuster as per the invention is designed to have a floating reference point.

Generally the reduction of gear ratios between a) Control gear and the Pinion and b) control worm screw and Regulator worm wheel are fixed such that only a fraction of adjustment is taking place during every brake application while compensating the excessive stack due to lining wear.

As such with the above features it is desired to have the adjustment of excess clearance made during the return stroke of the brake rather than during the brake application stroke to reduce the wear and thereby increase the life of the parts.

An Automatic Brake Adjuster for adjusting the slack between brake lining and brake drum of a vehicular braking system as per the invention comprises mainly of following:
a) A body (1) connectable to a brake actuator.
b) A clutch mechanism wherein a one way lock/clutch seat (29) forms a clutch with rotatable worm shaft (4) by mutually engageable serrations, the said worm shaft (4) meshing with a worm wheel (3) but perpendicular to its axis, the said one way lock/clutch seat (29) retained through thrust sleeve (26) against a heavy compression spring (9), which is preset to a desired load. The thrust sleeve (26) ensures free rotation of Regulator worm wheel (6) by-passing heavy compression spring (9) load. The clutch mechanism is to disengage worm shaft (4) from the regulator worm wheel (6) and one-way lock mechanism during the deflection stroke of brakes.
c) One-way lock mechanism formed between the faces (28'-29") of one way lock sleeve (28) and one way lock/clutch seat (29) engageable on worm shaft (4) at clutch serrations (4"-29') and other end of one way lock sleeve (28) which is coupled with Regulator worm wheel (6) by means of slots at the faces and one way lock spring (27) is to sense excess lining clearance due to wear and make adjustment automatically. All these parts are caged by means of retaining ring (30) on the thrust sleeve (26) to avoid the over ridding clutch serrations of one way lock/clutch seat (29) and worm shaft (4) when clutch is disengaged and for ease of assembly manufacturing and servicing the assembly.
d) A control arm assembly including a rotatable control arm (13) with a fixing portion (13') secured to a vehicle chassis to provide a reference point and a control gear wheel (12) with circumferential teeth also located in the bore of the worm wheel (3) but integral with control arm (13).
e) A pinion (16) with stepped faces is engageable with stepped faces of a control worm screw (19), wherein the gap (G) between stepped faces ensure radial clearance and desired slack ie. clearance stroke. Control worm screw meshes (D) with regulator worm wheel (6) to regulate the one lock mechanism function with rotation of control gear wheel (12) rotation.

According to the present invention, the Automatic Brake Adjuster includes an Automatic Brake Adjuster body (1) provided with a hole (2) in the tail portion for connecting to the brake actuator. The other end of the body houses a rotatable worm wheel (3), which has internal splines for fixing on the S camshaft. A rotatable Worm shaft (4) meshing with the worm wheel (3) is located in the body (1) perpendicular to the axis of the worm wheel (3).

For the purpose of manual rotation by a spanner, one end of the worm shaft (4) has a hexagon portion (4') protruding out of the body (1). On the hexagonal portion side is mounted a thrust sleeve (26), Regulator worm wheel (6), one way lock sleeve (28), one way lock/clutch seat (29), and one way lock spring (27) along with a thrust bearing (7) and a bearing retainer (5) which is screwed in to the body (1) and guides the worm shaft (4). The thrust sleeve (26) and the thrust bearing (7) are used to retain the one way lock/clutch seat (29) for free rotation against the heavy compression spring (9) load. A one way lock mechanism is formed between the face serrations (28'-29") of one way lock sleeve (28) and one way lock/clutch seat (29) with one way lock spring (27) and positioned between Regulator worm wheel (6) and worm shaft (4). A Sealing ring (25) is provided in the groove of the worm shaft (4) to prevent the entry of foreign particles. On the other side of the worm shaft (4) is mounted the spring seat (10), heavy compression spring (9) and the spring retainer (11). The spring retainer (11) is screwed into the body (1) for setting the desired spring load. A clutch mechanism is formed by the serration (29') on one way lock/clutch seat (29) and the serration (4") of the worm shaft (4). The engagement of this clutch is ensured by a heavy compression spring (9) that exerts load on to the worm shaft (4).

The control arm assembly (12-15 & 17) is located in the body on the same bore of the worm wheel (3) and independently operational. The rotatable control gear wheel (12) of the control arm assembly having gear teeth circumferentially is integral with Control arm (13), which has fixing portion (13'). The cover plate (14) is located in between control gear wheel (12) and control arm (13) along with sealing rings (15) and (17) to avoid entry of foreign particles.

The control arm assembly (12-15 & 17) is fixed on the body (1) with a Gasket (8) by means of screws (18) in the periphery holes of the cover plate (14). Control arm (13) is a rotatable attachment of the control arm assembly (12-15&17). The fixing portion of control arm (13') is to be rigidly secured on the vehicle chassis and the purpose of this is to provide a reference point for the Automatic Brake Adjuster as explained below.

Figure 3:
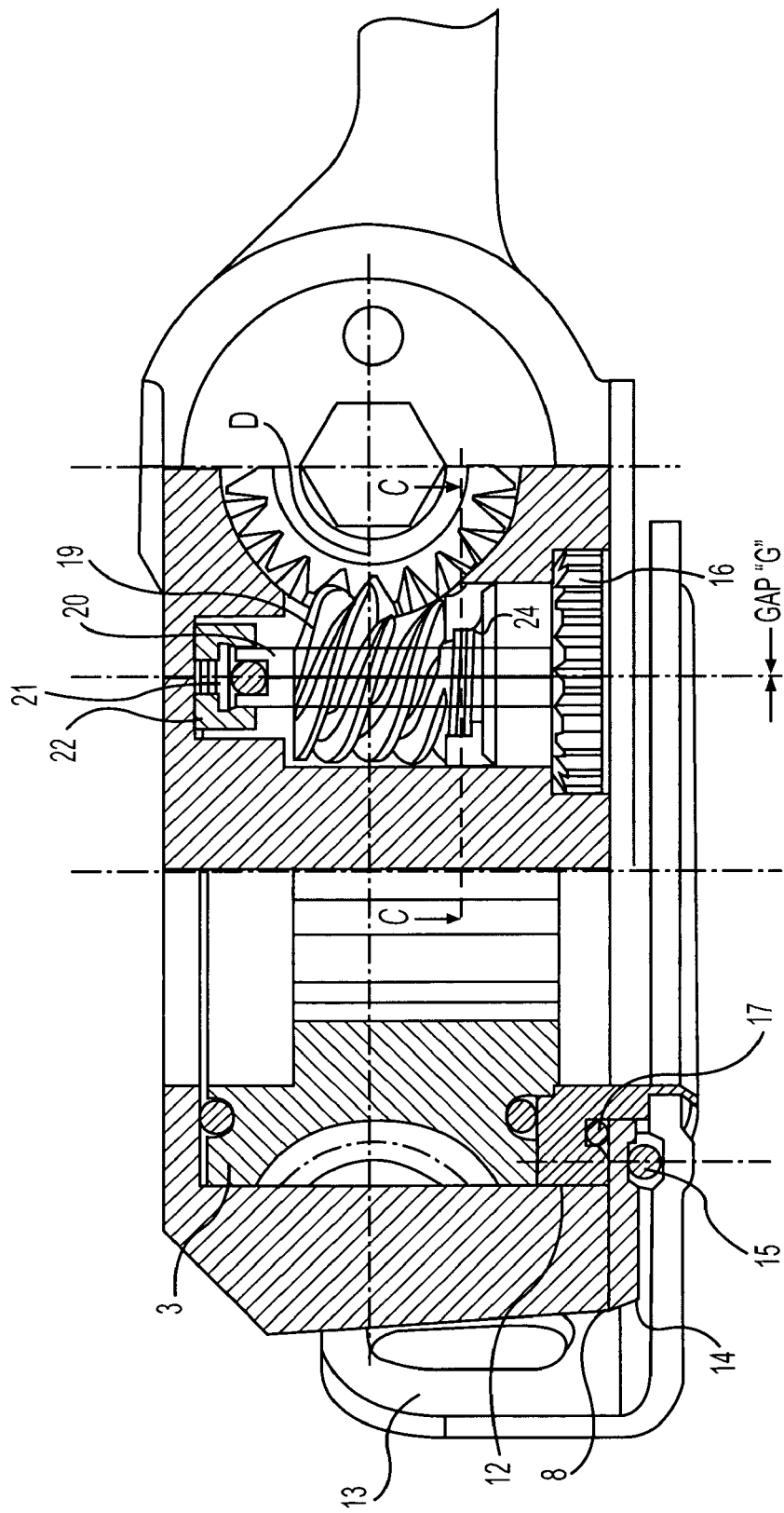
FIG. 3 is the End view sectioned along the tine A-A" of FIG. 1 to show the Pinion and Control arm assembly.
Figure 4:
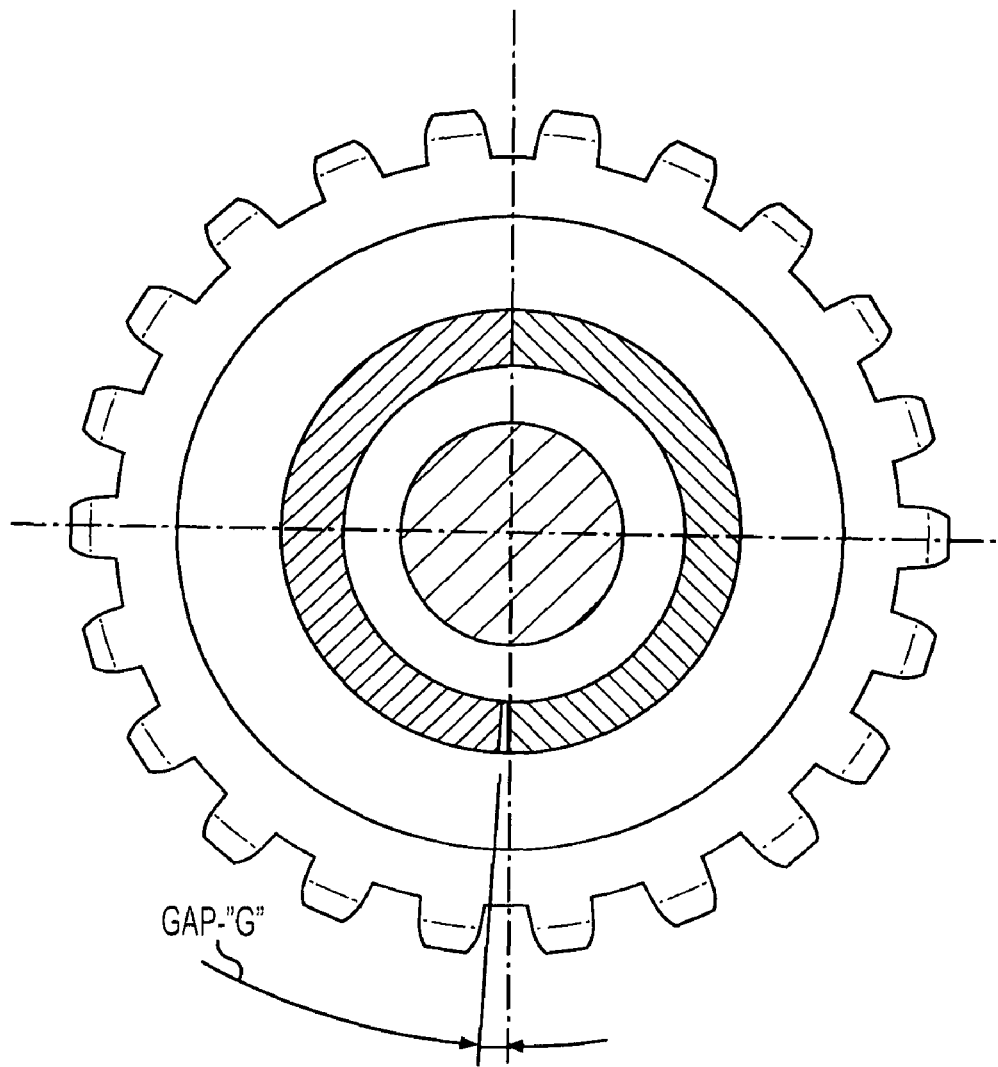
FIG. 4 is the End view sectioned along the line C-C of FIG. 3 to show the arrangement of pre-set gap in pinion assembly.

The Control gear wheel (12) meshes with the pinion (16) and is located in the worm wheel bore of the body (1). The location of the pinion is shown in FIGS. 3&4.

Pinion (16) and control worm screw (19) are aligned together by a spindle (23) with, Guide (20) and retained by the screw (21). The gap (G) provided in between the stepped faces of pinion (16) and the control worm screw (19) bore face is to give free movement initially during the rotation of pinion (16) by control gear wheel (12) to achieve the desired slack between the brake shoe and the brake drum which is otherwise called as the clearance stroke of the Automatic Brake Adjuster.

One-way lock mechanism formed between the faces (28'-29") one way lock sleeve (28) and one way lock/clutch seat (29) engageable on worm shaft (4) and other end of one way lock sleeve (28) which is coupled with Regulator worm wheel (6) by means of slots at the faces and one way lock spring (27) is to sense excess lining clearance due to wear and make adjustment automatically. All these parts are caged by means of retaining ring (30) on the thrust sleeve (26) to avoid the over riding clutch serrations of one way lock/clutch seat (29) and worm shaft (4) when clutch is disengaged and for ease of assembly manufacturing and servicing the assembly.

According to the present invention, the Automatic Brake Adjuster with flexible reference point incorporates an integrated one way lock and clutch mechanism over the worm shaft. The function of one way lock mechanism is to sense excess lining clearance due to wear and make adjustment automatically where as the function of clutch mechanism is to disengage worm shaft from regulator worm wheel during deflection stroke of brake actuator and both are caged together by means of a retaining ring. Provision of one way lock on larger area increases life of one way lock mechanism and caging of all these parts simplify the assembly manufacturing in addition to isolating the clutch seat from over ridding on worm shaft clutch serrations during deflection stroke of brake actuator which enables to increase the life of clutch serrations on worm shaft and one way lock/clutch seat.

The controlled radial clearance between control worm screw and pinion is ensured by the gap provided between stepped faces of pinion and control worm screw and assembled together in the spindle with torsion spring ensures desired slack or control distance for the Automatic Brake Adjuster for maintaining the clearance between the brake lining and the drum. The pinion, control worm screw are aligned together by spindle and is retained by a screw with guide to facilitate easy dismantling and re-assembling as shown in enclosed drawing (FIG. 3). These parts are assembled in the body with the compression spring at the bottom.

Now the operation of the Automatic Brake Adjuster is described herein whose construction and functionality as per the invention has been described in the previous paras:

When the Brake is applied with excess lining clearance to begin with during the initial brake application, the pinion (16) is rotated by the control arm assembly (12-15 & 17), which is rigidly mounted on the vehicle chassis, due to the movement of the lever. During the initial period of this operation the pinion (16) rotates freely until the pre-set gap (G) between the stepped faces of control worm screw (19) and pinion (16) is closed. This free rotation of pinion (16) ensures predetermined clearance stroke of the Automatic Brake Adjuster. Simultaneously the worm wheel (3) is rotated in the counter clockwise direction along with Automatic Brake Adjuster body (1); in turn the S camshaft engaged with the worm wheel spline (3') is rotated to lift the brake lining towards the brake drum.

During the further rotation (after passing through clearance stroke cycle) the control worm screw (19) is also rotated by the pinion (16), along with regulator worm wheel (6) in turn rotating the one way lock sleeve (28). As the other part of the one way lock i.e. one way lock/clutch seat (29) is now rigidly engaged with worm shaft serration formed as clutch mechanism, the one way lock sleeve (28) has to over ride over the mating faces (28'-29") against one way lock spring (27) load and engaging to a new location when the there is excess clearance between brake drum and brake lining.

This is because one way lock/clutch seat (29) is prevented from rotation by worm shaft (4) due to excess friction on the worm shaft with its serration (29') fully engaged on the worm shaft serration (4").

Once the brake lining engages the brake drum, the counter force increases and worm shaft (4) moves axially compressing the heavy compression spring (9) and clutch is disengaged as the serrated portion of worm shaft (4") is moved away from the one way lock/clutch seat serration (29').

As the clutch is now disengaged, the resistance on the one way lock/clutch seat (29) is removed and permits the one way lock/clutch seat (29) to rotate along with one way lock sleeve (28) and regulator worm wheel (6) as a whole unit retaining the relative positions. Thereby the lever movement during this period (expansion/deflection zone) is ignored.

When the brake is released, the pinion (16) is rotated in clockwise direction by the control gear wheel (12), opposite to the direction of brake application and the control worm screw (19) follows the rotation of pinion (16) as a whole unit along with regulator worm wheel (6), one way lock sleeve (28) and one way lock/clutch seat (29) covering the deflection stroke of the Automatic Brake Adjuster. However the worm shaft (4) remains static as the clutch is disengaged between serrations (4") and (29').

Once the brake lining moves away from the brake drum, the force is reduced and the load of the heavy compression spring (9) moves the worm shaft (4) to engage the clutch preventing the free rotation of one way lock/clutch seat (29).

During the further release movement of brake actuator, the body (1) keeps rotating in clock-wise direction; the control gear wheel (12) continues to rotate the pinion (16) along with control worm screw (19) until the closed gap between control worm screw (19) and pinion (16) is restored against the torsion spring (24). This movement covers the clearance stroke of the Automatic Brake Adjuster, which was achieved during the initial period of brake application. However the one way lock/clutch seat (29) and the one way lock sleeve (28) along with regulator worm wheel (6) are prevented from rotation due to the friction in clutch engaged condition during this period.

During the final releasing rotation of Automatic Brake Adjuster, the pinion (16) rotated by the control gear wheel (12) in turn rotates the control worm screw (19) along with regulator worm wheel (6) and in turn rotates one-way mechanism as a whole. The worm shaft (4) that is now engaged with one way lock/clutch seat (29) is rotated and in turn rotates the worm wheel (3) and 'S' camshaft to effect the adjustment of lining clearance. This is in proportion to the new engagement taken place during the brake application stroke explained earlier.

The function explained in last paragraph is applicable only for brake application with excess lining clearance, where the one way lock sleeve (28) is engaged in a new location and later disengaged as above. Whenever the brake is applied with optimum brake lining clearance, the over-riding of oneway lock sleeve on the one way lock/seat will not take place after completing the clearance stroke of the Automatic Brake Adjuster.

In the preferred embodiment as described herein and illustrated in the accompanying drawings, an Automatic Brake Adjuster with a floating reference point with one way lock and clutch mechanism as per the invention for adjusting the slack between brake lining and brake drum of a vehicular braking system comprising:

a) a body (1) comprising a hole (2) in the tail portion of the said body connectable to a brake actuator,
b) a rotatable internally splined worm wheel (3) in the other portion of the said body for receiving the S cam shaft,
c) a clutch cum one way lock mechanism comprising a rotatable worm shaft (4) secured perpendicular to worm wheel (3) but meshing with the worm wheel (3), a one way lock/clutch seat (29) is having serrations (29') engaged with serrations (4") of worm shaft (4) and the worm shaft (4) is guided by a bearing retainer (5), a regulator worm wheel (6) located on the thrust sleeve (26) mounted on worm shaft (4) but engageable to a one way lock/clutch sleeve (28) which also is located on thrust sleeve (26) and which in turn is engaged to one way lock/clutch seat (29) such that clutch mechanism and one way lock mechanism are on the worm shaft (4),
d) a bearing retainer (5) alongwith a thrust bearing (7) retains the one way lock/clutch seat (29) engageable with worm shaft (4) through a thrust sleeve (26) against a heavy compression spring (9), thereby isolating regulator worm wheel (6) and one way lock sleeve (28) for free movement,
e) a retaining ring (30) provided on the thrust sleeve (26) cages the worm shaft (4) and the regulator worm wheel (6) for isolating clutch seat serrations (29') from over-riding on worm shaft clutch serrations (4") while clutch is in disengaged condition,
f) wherein one way lock mechanism and clutch mechanism are over the worm shaft (4),
g) wherein one way lock mechanism and clutch mechanism are integrated as single part—one way lock/clutch seat.

An Automatic Brake Adjuster with a floating reference point with one way lock and clutch mechanism for adjusting the slack between brake lining and brake drum of a vehicular braking system comprising:

a) a body (1) comprising a hole (2) in the tail portion of the said body connectable to a brake actuator,
b) a rotatable internally splined worm wheel (3) in the other portion of the said body for receiving the S cam shaft,
c) a clutch cum one way lock mechanism comprising
  i) a rotatable worm shaft (4) having serrations (4") and secured perpendicular to axis of the worm wheel (3) and but meshing with the worm wheel (3),
  ii) a one way lock/clutch seat (29) having serrations (29') engaged with serrations (4") of the worm shaft (4) guided by bearing retainer (5),
  iii) a one way lock mechanism comprising:
    a regulator worm wheel (6) engageable by means of slots at the faces with a one way lock sleeve (28) having serrations (28') are located on the thrust sleeve (26) alongwith one-way lock spring (27) and mounted on hexagonal end (4') of the worm shaft (4) at one end,
  iv) a heavy compression spring (9) alongwith a spring seat (10) and a spring retainer (11) mounted on the other end of the worm shaft (4),
  v) a seating ring (25) secured in a groove of the worm shaft (4),
  vi) wherein the bearing retainer (5) alongwith a thrust bearing (7) retains the one way lock/clutch seat (29) through a thrust sleeve (26) against the heavy compression spring (9) so as to isolate the regulator worm wheel (6) and one way lock sleeve (28) for free movement,
  vii) wherein said spring retainer (11) screwed correspondingly onto the said body (1) for presetting the spring load,
  viii) wherein the one way lock/clutch seat (29) forms a clutch by the serrations (29') seating on serrations (4") of worm shaft,
  ix) wherein the heavy compression spring (9) exerts load onto the worm shaft (4) so as to ensure the engagement of the clutch,
  x) wherein one way lock sleeve (28) forms a lock by serrations (28') seating on serrations (29") of one way lock/clutch seat (29) at the other end.
d) a control arm assembly comprising:
  a rotatable control arm (13) with a fixing portion (13'),
  a control gear wheel (12) having circumferential teeth and located in the bore of worm wheel (3) and integral with the control arm (13),
  a cover plate (14) alongwith sealing rings (15 & 17) is mounted inbetween control gear wheel (12) and control arm (13),
  wherein a gasket (8) alongwith screws (18) in the periphery holes of the cover plate (14) to ensure rigid attachment on the body (1),
  wherein the fixing portion (13') is rigidly secured to vehicle chassis for providing a reference point, and
e) a pinion assembly comprising:
  a pinion (16) meshing with the control gear wheel (12), having stepped faces,
  a control worm screw (19) with stepped faces adaptable to engage with stepped faces of pinion (16),
  wherein a spindle (23), guide (20) and screw (21) align the pinion (16) and control worm screw (19),
  wherein the gap (G) between the stepped faces of the pinion (16) and control worm screw (19) bore face ensure radial clearance to enable free movement initially during the rotation of pinion (16) by control gear wheel (12) thus ensuring required radial movement to achieve the desired slack between brake shoe and brake drum which is known as clearance stroke of automatic brake adjuster.

It will be apparent that the preferred embodiments of the invention disclosed are well designed to fulfill the objects stated, it will be appreciated that invention is welt understood to those skilled in the art and that all changes and modifications that come without departing the spirit thereof is also assumed to be covered in the specification of the invention and in the claims made in the invention.

We claim:

1. An Automatic Brake Adjuster with a floating reference point with a one-way lock and clutch mechanism for adjusting the slack between a brake lining and a brake drum of a vehicular braking system comprising:
  a body connectable to a brake actuator at a first portion,
  a rotatable internally splined worm wheel in a second portion of said body for receiving an S shaped cam shaft,
  a clutch cum one-way lock mechanism comprising a rotatable worm shaft having serrations and secured perpendicular to worm wheel but meshing with the worm wheel, a one-way lock/clutch seat having serrations engaged with serrations of worm shaft and guided by a bearing retainer to form a clutch mechanism, a regulator worm wheel engageable by means of slots at the faces with a one-way lock sleeve having serrations and positioned on a thrust sleeve along with a one-way lock spring, and further mounted on hexagonal end of worm shaft such that said clutch mechanism and said one-way lock mechanism are on the worm shaft, the bearing retainer along with a thrust bearing retains the one-way lock/clutch seat through a thrust sleeve against a heavy compression spring, thereby isolating said regulator worm wheel and one-way lock sleeve for free movement, a retaining ring provided on said thrust sleeve cages, the worm shaft and the regulator worm wheel and the one-way lock/clutch seat for isolating clutch seat serrations from overriding on worm shaft clutch serrations, while clutch is in disengaged condition, wherein, said one-way lock mechanism and said clutch mechanism, are over the worm shaft, and wherein said one-way lock mechanism and said clutch mechanism are integrated as a single part in said one-way lock/clutch seat characterized in that the one-way lock spring is located on the thrust sleeve, and the retaining ring is provided on the thrust sleeve and cages the one-way lock sleeve, the one-way lock/clutch seat and the regulator worm wheel for isolating clutch seat serrations from overriding on the worm shaft clutch serrations while the clutch is in the disengaged condition.

2. An Automatic Brake Adjuster with a floating reference point with a one-way lock and clutch mechanism for adjusting the slack between a brake lining and a brake drum of a vehicular braking system comprising:

a body having a tail portion and an other portion and having a hole in the tail portion of said body, said body being connectable to a brake actuator, a rotatable internally splined worm wheel in the other portion of said body for receiving an S cam shaft, a clutch cum one-way lock mechanism comprising:
  a rotatable worm shaft having serrations and secured perpendicularly to the axis of the worm wheel, and meshing with the worm wheel,
  a one-way lock/clutch seat having serrations engaged with serrations of the worm shaft mounted at a hexagonal end of the worm shaft along with a bearing retainer engageable to guide the worm shaft,
  a one-way lock mechanism comprising:
    a one-way lock sleeve and the one-way lock/clutch seat having serrations to form the one-way lock mechanism along with one-way lock spring and engageable by means of slots at the faces of said regulator worm wheel are located on a thrust sleeve and mounted at a hexagonal end of said worm shaft at one end,
  a heavy compression spring along with a spring seat and a spring retainer mounted on the other end of the worm shaft,
  a sealing ring secured in a groove of the worm shaft,
  wherein the bearing retainer along with a thrust bearing retains the one-way lock/clutch seat through a thrust sleeve against the heavy compression spring so as to isolate the regulator worm wheel and one-way lock sleeve and the one-way lock/clutch seat for free rotation,
  wherein said spring retainer screwed correspondingly onto said body for presetting the spring load,
  wherein the one-way lock/clutch seat forms a clutch by the serrations seating on serrations of said worm shaft,
  wherein the heavy compression spring exerts load onto the worm shaft so as to ensure the engagement of the clutch,
  wherein said one-way lock sleeve forms a lock by serrations seating on serrations of said one-way lock/clutch seat at the other end, a control arm assembly comprising:
  a rotatable control arm with a fixing portion,
  a control gear wheel having circumferential teeth and located in the bore of worm wheel and integral with the control arm,
  a cover plate along with sealing rings is mounted in between control gear wheel and control arm,
  wherein a gasket along with screws in the periphery holes of the cover plate to ensure rigid attachment on the body,
  wherein the fixing portion is rigidly secured to a vehicle chassis for providing a reference point, and a pinion assembly comprising:
  a pinion meshing with the control gear wheel,
  having stepped faces,
  a control worm screw with stepped faces adaptable to engage with stepped faces of said pinion,
  wherein a spindle, a guide and a screw align the pinion and control worm screw, wherein a gap between the stepped faces of said pinion and control worm screw bore face ensure radial clearance to enable free movement initially during the rotation of pinion by control gear wheel thus ensuring required radial movement to achieve the desired slack between said brake shoe and said brake drum which is known as clearance stroke of said automatic brake adjuster.

* * * * *